US012768495B2

(12) United States Patent
Angenent

(10) Patent No.: US 12,768,495 B2
(45) Date of Patent: Oct. 20, 2026

(54) EXPANDABLE ASSEMBLY FOR A CEILING

(71) Applicant: Duux Holding B.V., Uden (NL)

(72) Inventor: Mark Angenent, Uden (NL)

(73) Assignee: Duux Holding B.V., Uden (NL)

( * ) Notice: Subject to any disclaimer, the term of this patent is extended or adjusted under 35 U.S.C. 154(b) by 176 days.

(21) Appl. No.: 18/548,543

(22) PCT Filed: Mar. 3, 2022

(86) PCT No.: PCT/NL2022/050120
§ 371 (c)(1),
(2) Date: Aug. 31, 2023

(87) PCT Pub. No.: WO2022/186694
PCT Pub. Date: Sep. 9, 2022

(65) Prior Publication Data

US 2024/0151350 A1 May 9, 2024

(30) Foreign Application Priority Data

Mar. 3, 2021 (NL) ...................................... 2027695

(51) Int. Cl.

| | |
|---|---|
| ***F16M 13/02*** | (2006.01) |
| ***F16M 11/20*** | (2006.01) |
| ***F21V 9/40*** | (2018.01) |
| ***F21V 21/03*** | (2006.01) |
| ***F21V 33/00*** | (2006.01) |
| *F21Y 115/10* | (2016.01) |

(52) U.S. Cl.
CPC ...... *F16M 13/027* (2013.01); *F16M 11/2014* (2013.01); *F21V 9/40* (2018.02); *F21V 21/03* (2013.01); *F21V 33/0096* (2013.01); *F16M 2200/08* (2013.01); *F21Y 2115/10* (2016.08)

(58) Field of Classification Search
CPC ....... F21V 21/03; F21V 21/35; F16M 13/027; H01R 33/88; H01R 27/00; H01R 33/90; H01R 25/16
See application file for complete search history.

(56) References Cited

U.S. PATENT DOCUMENTS 4,475,226 A * 10/1984 Greenberg ............... H04R 3/12 362/370
8,061,865 B2 * 11/2011 Piepgras ................ F21V 29/70 362/292
8,763,750 B1 * 7/2014 Berkman ................. H04R 1/02 181/150

(Continued)

FOREIGN PATENT DOCUMENTS

DE 202012012509 U1 3/2013
GB 2473193 A 3/2011

OTHER PUBLICATIONS

International Search Report and Written Opinion received for PCT Patent Application No. PCT/NL2022/050120, dated Aug. 9, 2022, 22 pages.

*Primary Examiner* — Bradley Duckworth
(74) *Attorney, Agent, or Firm* — AEON Law, PLLC; Adam L. K. Philipp; Charlotte E. Holoubek

(57) ABSTRACT

The present invention is in the field of a fan with rotating blades in a substantially open casing, typically a fan for relatively small spaces at work or at home, such as rooms, and offices. The fan is improved in terms of production of noise, improved air flow, reduced power consumption, and improved pitch.

12 Claims, 3 Drawing Sheets

(56) References Cited

U.S. PATENT DOCUMENTS

| | | | | |
|---|---|---|---|---|
| 9,739,460 | B2 * | 8/2017 | Haubach | F21S 8/04 |
| 10,208,946 | B2 * | 2/2019 | Roca | F21V 23/045 |
| 10,292,289 | B2 * | 5/2019 | Spiro | G05B 15/02 |
| 10,310,464 | B1 * | 6/2019 | Lu | H05B 47/105 |
| 10,907,820 | B2 * | 2/2021 | Haaf | F21S 8/026 |
| 10,989,400 | B2 * | 4/2021 | Kohen | F21V 23/06 |
| 11,098,884 | B2 * | 8/2021 | Machate | F21V 21/35 |
| 11,175,026 | B1 * | 11/2021 | Yu | F21V 21/088 |
| 11,448,386 | B2 * | 9/2022 | Booth | F21V 23/008 |
| 11,649,953 | B2 * | 5/2023 | Vancorenland | F21V 14/02 315/152 |
| 11,651,258 | B2 * | 5/2023 | Spero | G05B 13/041 700/90 |
| 12,176,662 | B2 * | 12/2024 | Ladstätter | F21V 21/35 |
| 2011/0287665 | A1 * | 11/2011 | Chien | G06F 1/266 439/638 |
| 2020/0126701 | A1 | 4/2020 | Yao et al. | |
| 2020/0173646 | A1 * | 6/2020 | Marinus | F24F 1/0373 |
| 2020/0389941 | A1 * | 12/2020 | Scanlon | H05B 3/06 |
| 2021/0002170 | A1 | 1/2021 | Chien et al. | |
| 2024/0090103 | A1 * | 3/2024 | Van De Sluis | H05B 45/10 |

* cited by examiner

EXPANDABLE ASSEMBLY FOR A CEILING

RELATED APPLICATIONS

This application is a national entry of PCT International Patent Application No. PCT/NL2022/050120, filed Mar. 3, 2022, in the name of "DUUX HOLDING B.V." [NL], which PCT application claims the benefit of priority of Netherlands Patent Application Serial No. 2027695, filed Mar. 3, 2021, in the name of "DUUX HOLDING B.V." [NL]. The entire contents of the above-referenced applications and of all priority documents referenced in the Application Data Sheet filed herewith are hereby incorporated by reference for all purposes.

FIELD OF THE INVENTION

The present invention is in the field of mechanical and electrical engineering, such as lighting and cooling, and in particular to an expandable assembly for electrically driven devices, a kit of parts comprising said devices, a computer program for controlling said devices, and a device comprising said computer program.

BACKGROUND OF THE INVENTION

The present invention is in the field of a system for providing especially lighting and cooling. It is noted that many residences have limited space available, in particular for living. On the other hand heating a space, as well as lighting, and cooling is considered a requirement for nowadays rooms. The same is applicable for office rooms and the like. In view of the limited space available typically electrical appliance which are used as such may be considered to consume too much space. Sometimes electrical appliances are integrated, such as in a ceiling. However, when integrated, replacement is typically difficult or impossible, apart from changing light elements themselves, such as bulbs.

Incidentally US 2021/002170 A1 recites a wired and detachable charging unit of an electric product, which is moveable, can be disassembled, re-assembled, and uses a USB or wireless charging-unit.

The present invention therefore relates to an improved system, which solves one or more of the above problems and drawbacks of the prior art, providing reliable results, without jeopardizing functionality and advantages.

SUMMARY OF THE INVENTION

It is an object of the invention to overcome one or more limitations of the devices of the prior art and to improve these. In a first aspect the present invention relates to an expandable (that is increase in number) assembly (10) which is configured for attaching to a wall or ceiling comprising a base element (1), the base element comprising at least two universal receiving elements, such as a plug or a socket, or "male" or "female" element, at least one electric component (3,4,5,6,7,9) selected from a lamp (3), a fan (4), a speaker (5), a light reflector (6), a toy (7), a heater (9), and combinations thereof, an typically comprises two or more of these electrical components, such as 3-6 components, each electric component comprising a universal connector (8), such as a socket or a plug, or "female" or "male" element, wherein the universal connector of the at least one electric component and at least one universal receiving element of the base element are electrically removably connected to one and another and are removably fixed to one and another by the universal receiving element and universal connector, that is the universal connector and the receiving element are complementary to one and another. The term "universal" is used to indicate that all connectors of the electrical components, and likewise all receiving elements, are the same in view of dimensions, connections, etc. That is, an electric component can be plugged into any of the available receiving elements, thereby securing the electrical component into the base element, that is mechanically fixing, and providing electrical and other optional contacts, such that the electric component can function as intended.

In view of use the electric components may be positioned in the base element as desired, and in a specific embodiment even be replaced by one and another component; or likewise, over time components may be switched from a relative position.

In a second aspect the present invention relates to a kit of parts comprising at least one of a base element (1), and at least one electric component (3,4,5,6,7,9) of the expandable assembly according to the invention, wherein the at least one electric component (3,4,5,6,7,9) each individually preferably comprises a physical and electrical connector (8) adapted to fit in the at least one receiving element, preferably wherein all connectors are the same, preferably a cylindrical connector, wherein the connector may be selected from a bayonet mount, a screw mount, a click mount, and a spring.

In a third aspect the present invention relates to a computer program or hardware device comprising instructions for operating the expandable assembly (10) according to the invention, or a part thereof according to the invention, the instructions causing the expandable assembly (10) to carry out at least one of the following steps: receiving input with respect to at least one of oscillating frequency of the fan (4) or heater (9), horizontal movement of the fan or heater between 0-360 degrees, preferably from 0-250 degrees, vertical movement of the fan ore heater between 0-90 degrees, at least one range of angles wherein the fan or heater oscillates in between, at least one direction towards which the fan or heater provides an air flow/heat, a light intensity of at least one lamp, a volume of at least one speaker, a source of the at least one speaker, activating or de-activating of the at least one part, providing instructions to the at least one driver, and optionally determining at least one orientation of said hardware device comprising said computer program, such as by using a gyroscope, providing said input to the expandable assembly or part thereof, said input causing at least one part to adapt in view of the input. Therewith for instance the fan or heater can move in a reciprocating, oscillating motion, combining rotation, vertical up- and down movement, as well as combinations thereof, and parts thereof, such as incomplete rotations. Therewith it can provide an air flow in various directions, as desired by a user. The oscillating motion may be a complex motion.

The present invention also relates to a device comprising the computer program according to the invention, such as a mobile phone, a smartphone, a computer, and a CPU.

Advantages of the present description are detailed throughout the description.

DETAILED DESCRIPTION OF THE INVENTION

In an exemplary embodiment of the present expandable assembly the base element comprises an AC to DC converter, preferably wherein the DC voltage is from 1.5-48 V, preferably from 3-12 V, such as from 6-12 V.

In an exemplary embodiment of the present expandable assembly the at least one electric component (3,4,5,6,7,9) is removably connected to the at least one receiving element (2).

In an exemplary embodiment of the present expandable assembly the at least one receiving element (2) are equal to one and another, such that the at least one electric component (3,4,5,6,7,9) is interchangeable from one receiving element to the other.

In an exemplary embodiment the present expandable assembly further comprises at least one controller (18) for controlling at least one of movement of the fan (4), of air displacement of the fan (4), of a direction of the lamp (3), of the speaker (5), such as controlling a volume thereof, of controlling a sound direction thereof, of controlling an audio source thereof, of movement of the light reflector (6), and of movement of the toy (7).

In an exemplary embodiment of the present expandable assembly the at least one controller comprises at least one of a receiver, a transmitter, an on/off switch, such as a wireless on/off switch, or a combination thereof, preferably wherein the controller is addressable by using at least one of a wireless communication, such as Bluetooth, NF, NFC, Wi-Fi, and IR-radiation.

In an exemplary embodiment of the present expandable assembly further comprises at least one lamp dimmer, such as in the base element, or in the lamp.

In an exemplary embodiment the present expandable assembly may comprise at least one oscillation driver, preferably a first driver for horizontal oscillation, wherein said first driver is preferably located in the base element, and/or a second driver for vertical oscillation, wherein said second driver is preferably located in the fan or heater respectively, or a combined vertical and horizontal driver.

In an exemplary embodiment of the present expandable assembly the base element is substantially flat.

In an exemplary embodiment of the present expandable assembly the base element comprises a metal, such as steel.

In an exemplary embodiment of the present expandable assembly the base element is extendable.

In an exemplary embodiment of the present expandable assembly the base element is 2-10 cm thick.

In an exemplary embodiment of the present expandable assembly the base element is 10-40 cm wide.

In an exemplary embodiment of the present expandable assembly the base element is 20-60 cm deep.

In an exemplary embodiment of the present expandable assembly the base element comprises attachment means, such as for attaching to a wall or ceiling.

In an the present expandable assembly the receiving element is selected from a bayonet mount, a screw mount, and a plug mount, preferably a mount with a positive and negative electrical contact.

In an exemplary embodiment of the present expandable assembly the at least one electric component and at least one universal receiving element of the base element are configured to be removably connected in digital data contact to one and another In an exemplary embodiment the present expandable assembly comprises a combined fan and light source, the fan comprising a ventilator providing an air flow for ventilation of a space, characterized in a light source providing visible light, wherein the light source is located centrally in the air flow path of the ventilator.

In an exemplary embodiment of the present expandable assembly the light source provides light in a direction of the air flow, In an exemplary embodiment of the present expandable assembly, wherein the light source is at least one LED.

In an exemplary embodiment of the present expandable assembly the fan is adapted to be mounted horizontally or vertically, such as against a ceiling, or against a wall.

In an exemplary embodiment of the present expandable assembly the light source is provided in the proximity of an exit of the air flow path.

In an exemplary embodiment of the present expandable assembly the ventilator is provided in the proximity of an entry of the air flow path.

In an exemplary embodiment of the present expandable assembly the light source blocks no more than 36% of the air-flow path, preferably no more than 25%, more preferably no more than 16%, even more preferably no more than 10%.

In an exemplary embodiment of the present expandable assembly the ventilator has an air flow path with a cross-section selected from circular, triangular, square, rectangular, hexagonal, octagonal, ellipsoid, and combinations thereof.

In an exemplary embodiment of the present expandable assembly the light source provides light in a wavelength range of 400-800 nm, preferably combined light with a white appearance.

In an exemplary embodiment of the present expandable assembly the ventilator has an air flow of >0.1 $m^3$/minute.

In an exemplary embodiment of the present expandable assembly wherein the ventilator has an air flow of <25 $m^3$/minute.

In an exemplary embodiment of the present expandable assembly the ventilator comprises hollow duct for passing the air flow, wherein the duct provides a straight air flow path.

In an exemplary embodiment of the present expandable assembly the light source provides 1-100 W of light.

In an exemplary embodiment of the present expandable assembly the light source is provided in an area between 50% of the distance between the ventilator and the exit of the air flow path and the exit, preferably 70-100% of said distance.

The invention will hereafter be further elucidated through the following examples which are exemplary and explanatory of nature and are not intended to be considered limiting of the invention. To the person skilled in the art it may be clear that many variants, being obvious or not, may be conceivable falling within the scope of protection, defined by the present claims.

DETAILED DESCRIPTION OF FIGURES

Figure 1A:
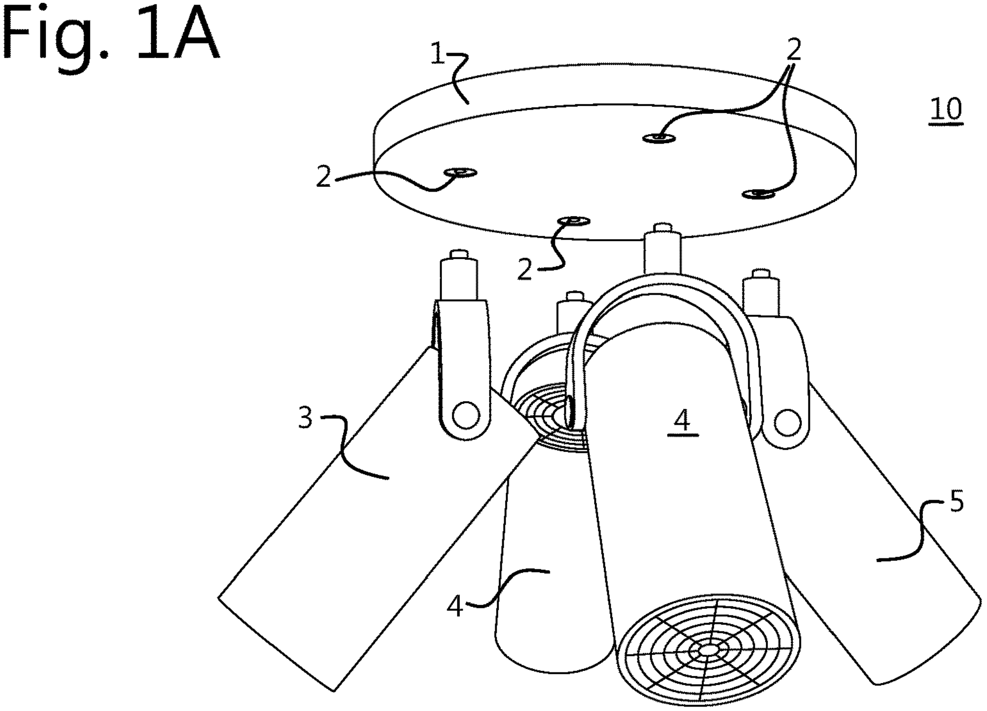
FIG. 1*a*-*b*, 2-5 show examples of the present expandable assembly.
Figure 1B:
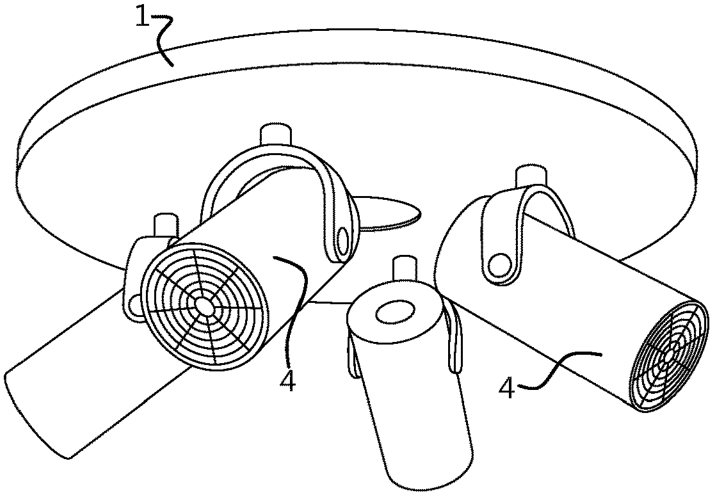

In the figures:
10 Expandable assembly
1 base element
2 receiving element
3 lamp
4 fan
5 speaker
6 light reflector
7 toy
8 connector
9 heater FIG. 1*a* shows a circular base plate 1 with four receiving elements 2, a lamp 3, to fans 4 and a speaker 5. In FIG. 1*b* these are attached to the base plate.

Figure 2:
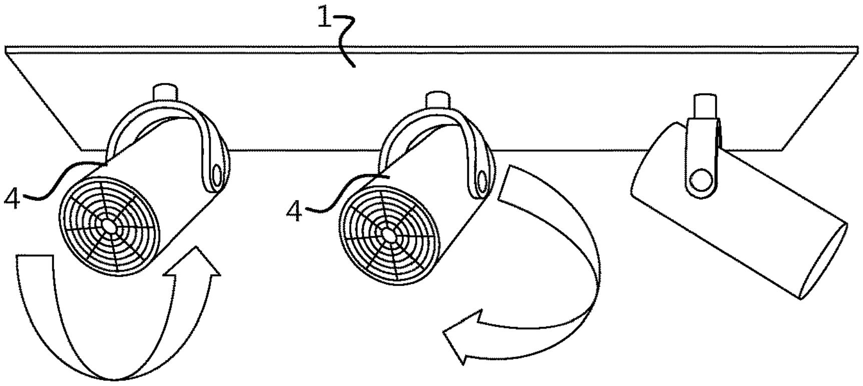

FIG. 2 shows a rectangular base plate 1 with three elements attached thereto, being two fans and one lamp. The fans can be provided with one or two actuators, such as electrical motors, for providing movement and/or oscillation, such as in a vertical and horizontal direction, or a combination thereof.

Figure 3:
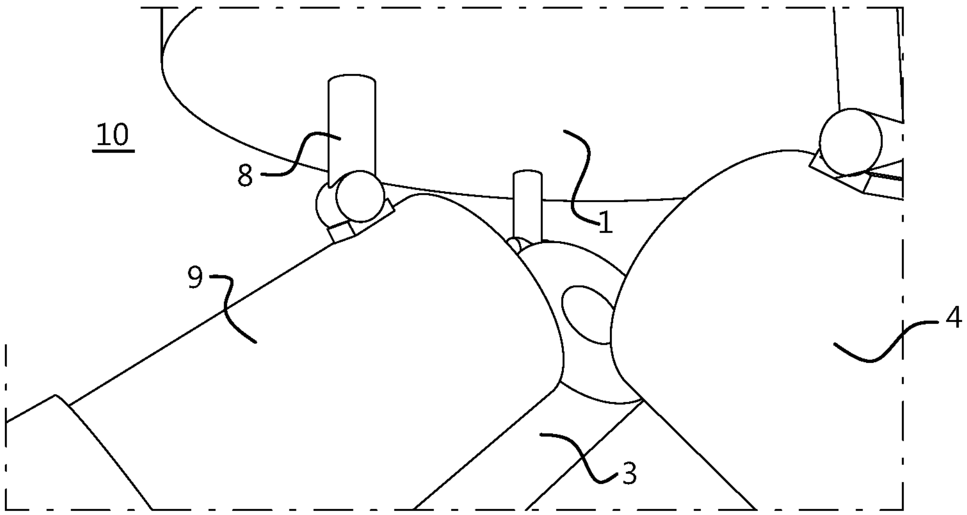

FIG. 3 shows the system of FIG. 1 with the connector 8 attached in the base plate 1, and a lamp, a fan and a heater.

Figure 4:
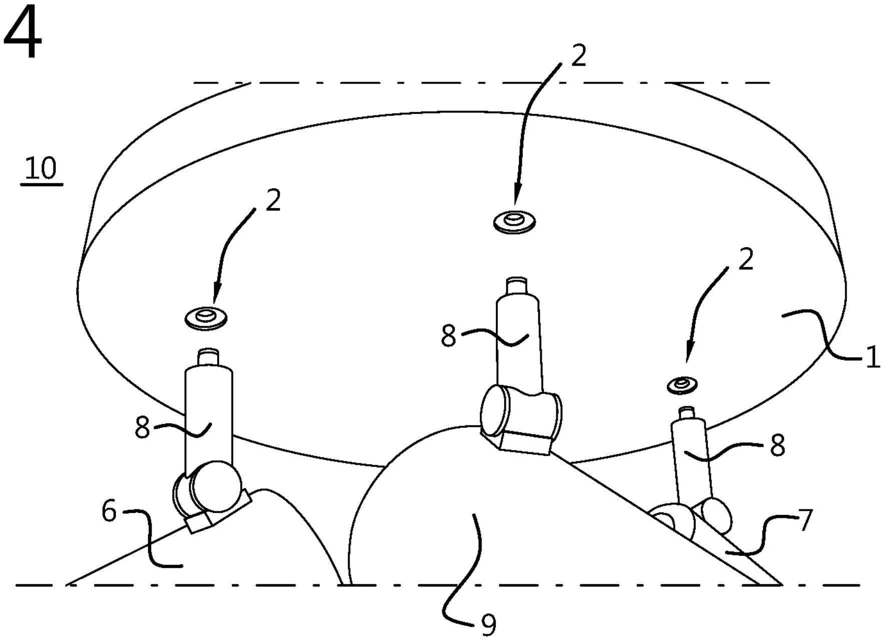

FIG. 4 shows that the elements can be easily removed and attached to the base plate 1, having electrical and physical connectors 8 of the elements visible close to the base plate and receiving elements 2 thereof. A light reflector 6, a heater 9, and a toy 7 are shown.

Figure 5:
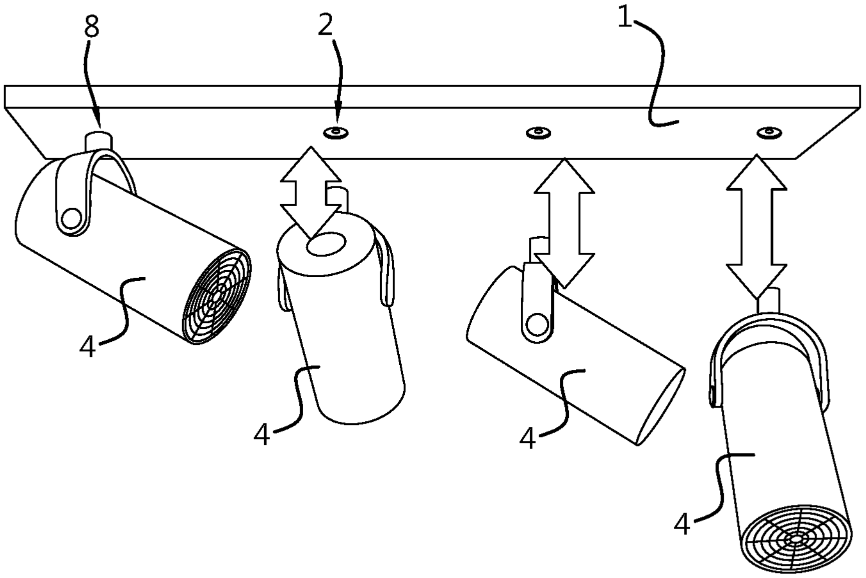

FIG. 5 shows that various elements can be easily attached and replaced, if desired. In this case a fan 4 is shown in four different positions, with connector 8 and receiving element 2 visible. Typically of course the fan, or likewise any other electric component, is removed or attached to one and the same positions in the base element.

The invention claimed is:

1. An expandable assembly configured for attaching to one of a wall and ceiling comprising a base element, the base element comprising at least two universal receiving elements, at least two portable electric components, selected from a lamp, a fan, a speaker, a light reflector, a toy, a heater, and combinations thereof, each electric component comprising a single universal connector integral with the electric component, wherein the at least two electric components and at least one universal receiving element of the base element are electrically removably connected to one and another directly and are removably fixed to one and another by the universal receiving element and single universal connector, such that the universal single connector of any of the at least two portable electric components is configured to be plugged into any of the at least two universal receiving elements thereby securing the portable electric component into the universal receiving element of the base element, wherein the universal connector of each portable electric component directly engages the universal receiving element without intermediate mounting hardware, wherein at least one of the at least one universal receiving element and universal connector is selected from a bayonet mount, a screw mount, and a plug mount.

2. The expandable assembly according to claim 1 wherein the mount contains a positive and negative electrical contact.

3. The expandable assembly according to claim 1, wherein at least one electric component and at least one universal receiving element of the base element are configured to be removably connected such that digital data contact between the at least one electric component and at least one universal receiving element of the base element is established.

4. The expandable assembly according to claim 1, wherein the base element comprises an AC connector, and an AC to DC converter, wherein the DC voltage is from 1.5-48 V.

5. The expandable assembly according to claim 1, wherein all receiving elements are identical to one and another, such that the at least one electric component is interchangeable from one receiving element to the other.

6. The expandable assembly according to claim 1, further comprising at least one controller for controlling at least one of movement of the fan, of air displacement of the fan, of a direction of the lamp, of the speaker, for controlling a volume thereof, of controlling a sound direction thereof, of controlling an audio source thereof, of movement of the light reflector, and of movement of the toy.

7. The expandable assembly according to claim 6, wherein the at least one controller comprises at least one of a receiver, a transmitter, an on/off switch, and a wireless on/off switch, wherein the controller is addressable by using at least one of a wireless communication, selected from Bluetooth, NF, NFC, Wi-Fi, and IR-radiation.

8. The expandable assembly according claim 1, further comprising at least one lamp dimmer, provided in one of the base element, and the lamp.

9. The expandable assembly according to claim 1, comprising at least one actuator, selected from an oscillation driver, and an electromotor, wherein the at least one actuator is adapted to rotate at least one electric element around a rotational axis extending from the base element, wherein a first actuator is for horizontal oscillation, wherein said first actuator is located in the base element.

10. The expandable assembly according to claim 1, wherein the base element is substantially flat, and wherein the base element comprises a metal, and wherein the base element is 2-10 cm thick, and wherein the base element is 10-40 cm wide, and wherein the base element is 20-60 cm deep, and wherein the base element is configured for attaching to a wall.

11. The expandable assembly according to claim 1, wherein at least one of the portable electric components comprises a combined fan and light source, the fan comprising a ventilator providing an air flow for ventilation of a space, and a light source providing visible light, wherein the light source is located centrally in the air flow path of the ventilator.

12. The expandable assembly according to claim 11, wherein the light source provides light in a direction of the air flow, and wherein the light source is at least one LED, and wherein the fan is adapted to be mounted in one of horizontally and vertically, and wherein the light source is provided in the proximity of an exit of the air flow path, and wherein the ventilator is provided in the proximity of an entry of the air flow path, and wherein the light source blocks no more than 36% of the air-flow path, and wherein the ventilator has an air flow path with a cross-section selected from circular, triangular, square, rectangular, hexagonal, octagonal, ellipsoid, and combinations thereof, and wherein the light source provides light in a wavelength range of 400-800 nm, and wherein the ventilator has an air flow of >0.1 $m^3$/minute, and wherein the ventilator has an air flow of <25 $m^3$/minute, and wherein the ventilator comprises a hollow duct for passing the air flow, wherein the duct provides a straight air flow path, and wherein the light source provides 1-100 W of light, and wherein the light source is provided in an area between 50% of the distance between the ventilator and the exit of the air flow path.

* * * * *